United States Patent [19]

Manicone

[11] Patent Number: 5,748,718
[45] Date of Patent: May 5, 1998

[54] TELEPHONE MONITORING SYSTEM TO REDUCE CONSUMER PAYMENTS OF TELEPHONE BILL

[76] Inventor: Paul Manicone, 82-58 Eliot Ave., Middle Village, N.Y. 11379

[21] Appl. No.: 373,426

[22] Filed: Jan. 17, 1995

[51] Int. Cl.[6] .................. H04M 15/00; H04M 15/06; H04M 1/56

[52] U.S. Cl. .................. 379/131; 379/130; 379/140; 379/142; 379/376

[58] Field of Search .................. 379/111, 112, 379/113, 130, 131, 140, 141, 142, 149, 373, 376

[56] References Cited

U.S. PATENT DOCUMENTS

| | | | |
|---|---|---|---|
| 4,751,728 | 6/1988 | Treat | 379/140 |
| 4,924,496 | 5/1990 | Figa et al. | 379/142 |
| 5,230,017 | 7/1993 | Alexander | 379/140 |
| 5,255,183 | 10/1993 | Katz | 379/140 |
| 5,265,145 | 11/1993 | Lim | 379/199 |
| 5,396,548 | 3/1995 | Bayerl et al. | 379/140 |
| 5,400,395 | 3/1995 | Berenato | 379/130 |

*Primary Examiner*—Curtis Kuntz
*Assistant Examiner*—Paul Loomis
*Attorney, Agent, or Firm*—Michael I. Kroll

[57] ABSTRACT

The present invention relates to an apparatus and method for a telephone management system having a CPU, rate data storage, random access memory, program storage, telephoe interface, memory bus, printer, numeric and functinal keypads, speaker and at least two display monitors.

5 Claims, 4 Drawing Sheets

TUESDAY
MAY 18 1993
10:12 AM

1) TUESDAY
2) MAY 18, 1993
3) (512) 372 9029
4) START: 12:03 PM
5) END   12:24 PM
6) TOTAL: 21 MINUTES
   AT $.03 MINUTE
7) COST $.63

FIG. 4 ("A" DISPLAY)

1 - TUESDAY
2 - MAY 18, 1993
3 - (305) 271 0656
4 - START: 7:15 PM
5 - TIME NOW 7:19PM
6 - PRICE $.84 MIN.
7 - CURRENT TIME OF CALL  4 MIN.
8 - CURRENT PRICE $ 3.36
9 - END
10 - TOTAL: NOT COMPLETED

FIG. 5 ("B" DISPLAY)

BILLING PERIOD CURRENT
FEB. 01, 1993  FEB. 28, 1993
TOTAL CALLS: 135
TOTAL MINUTES: 540
PRICE PER MINUTE: $.04
TOTAL COST: $21.60
AVG. CALLS/DAY: 4.8
AVG. MINUTES / DAY: 19
AVG. COST / DAY: $.77
AVG. CALL/WEEK: 34
AVG. MINUTES/WK: 135
AVG. COST   /WK: $ 5.40
AVG. COST / CALL: $.16
THIS PERIOD (-) $8.00
COMPARED TO LAST PERIOD
   SAVINGS OF $8.00
CALLS RECEIVED: 85
PRINT  (Y)ES    (N)O

FIG. 6 ("C1" DISPLAY)

CHECKING: (503)638 1001
1) TIME CALL BEGAN
   SUN 5/10/93  1:15A
2) TIME CALL ENDED - 1:23
3) TOTAL TIME TALKED 8 MIN.
4) PRICE PER MIN.  $.44
5) TOTAL PRICE OF CALL $ 3.52

PRINT? (Y)ES  (N)O

FIG. 7 ("C3" DISPLAY)

ENTER AMOUNT FOR DAY:
  $ 10.00
ENTER AMOUNT FOR WEEK:
  $ 50.00
ENTER AMOUNT FOR MONTH
  $ 150.00

EXPENSE ALARM

FIG. 8 ("C4" DISPLAY DATA ENTRY)

YOUR COST FOR TODAY
HAS REACHED $ 9.50
YOU HAVE A PRESET LIMIT
FOR $10.00. SHOULD YOU
CONTINUE THIS PHONE
CALL, YOU WILL HAVE
REACHED YOUR LIMIT
IN 2 MINUTES.

EXPENSE ALARM

FIG. 9 ("C4" DISPLAY ALARM)

FIG. 10 "C6" DISPLAY (DATA ENTRY)

ENTER # CALLS FOR DAY:
15
ENTER # CALLS FOR WEEK
90
ENTER # CALLS FOR MONTH
300

CALL ALARM

FIG. 11 "C6" DISPLAY (ALARM)

YOUR PRESET LIMIT FOR THE DAY IS 15 PHONE CALLS, YOU ARE ABOUT TO MAKE YOUR 16th ONE.

CALL ALARM

FIG. 12 "C6" DISPLAY

WEDS, MAY 10, 1993
12:00PM TO 2:00PM
12:05PM 201-875-3296  8 MIN
12:25PM 516-391-4562  12 MIN
1:13PM 011-86-22-503982  18MIN
1:55PM 303-452-1910  4 MIN

TOTAL CALLS: 4
TOTAL MIN: 42

PRINT? (Y)ES (N)O

CALLS IN TIME FRAME

FIG. 13 "C7" DISPLAY #1

DO YOU WISH TO BLOCK NUMBERS?
(Y)ES  (N)O     YES
DO YOU WISH TO BLOCK ALL NUMBERS DURING THIS TIME FRAME EXCEPT POLICE, FIRE, AND NUMBERS BELOW?
(Y)ES  (N)O     YES
PLEASE ENTER ALLOWED NUMBERS:
301-982-4500
675-0123
201-455-0900

```
ALL CALLS BLOCKED EXCEPT
POLICE, FIRE AND NUMBERS
ABOVE
```

CALL BLOCKING

FIG. 14 "C7" DISPLAY #2

DO YOU WISH TO BLOCK NUMBERS?
(Y)ES  (N)O     NO
DO YOU WISH TO ALLOW NEW NUMBERS:
(Y)ES  (N)O     YES
LIST OF CURRENT ALLOWED NUMBERS:
305-721-9000
415-621-1234
ADD ADDITIONAL NUMBERS
215-241-1300
408-999-1234
WHICH NUMBERS DO YOU WANT BLOCKED?
900-423-7777
DO YOU WISH TO HAVE THESE NUMBERS BLOCKED DURING THIS TIME PERIOD (YES, OR INDEFINITELY (N)O?
YES

CALL BLOCKING

FIG. 15 "C8" DISPLAY

YOU HAVE A PRESET LIMIT FOR EACH PHONE CALL OF $1.00 YOUR COST AS OF NOW HAS REACHED .75 CENTS. SHOULD YOU CONTINUE THIS CALL, YOU WILL HAVE REACHED YOUR PRESET LIMIT IN 2 MINUTES.

CALL ALARM

```
ENTER  YOUR
 PERSONAL
ACCESS  CODE
    TO
 ACTIVATE
PHONE  MISER
```

FIG. 17

```
JUN 10  305-123-4567  3:30PM  12MIN  .80
JUN 10  407-521-1300  4:17PM   6MIN  .43
JUN 12  907-999-9999  7:19PM   3MIN  .13
  ″       ″              ″      ″     ″
  ″       ″              ″      ″     ″
  ″       ″              ″      ″     ″
  ″       ″              ″      ″     ″
  ″       ″              ″      ″     ″

PRINT (YES  (NO
LONG DISTANCE CALLS
```

FIG. 16 "C9" DISPLAY

TELEPHONE MONITORING SYSTEM TO REDUCE CONSUMER PAYMENTS OF TELEPHONE BILL

BACKGROUND OF THE INVENTION

Field of the Invention

The invention relates generally to a computerized system for telephone call monitoring. More particularly, the present invention relates to the real time system for determining itineraries for telephone call monitoring systems which are optimal based upon the user's criteria.

The present invention relates generally to telecommunications equipment and more particularly to a customer premise call management device to provide detection and visual indication of incoming telephone calls, time of call, date of call, cost of call, length of call and to perform message indication and monitoring functions in conjunction with either personal telephone call monitoring or central office based telephone call monitoring.

The present invention relates generally to the field of providing customized telephone call monitoring services, and more specifically to the problem of providing customized telephone services.

DESCRIPTION OF THE PRIOR ART

Implementing new telephone services has long been a problem for telephone companies. In today's advanced intelligent network ("AIN"), when a new service such as call waiting is developed, the economics of developing and implementing that service require that the service be provided on a mass scale to as many customers as possible. Oftentimes, even if a service is desired by some customers, the service may never be implemented if that service cannot be mass marketed, or otherwise economically justified.

Telephone functions are presently provided to a customer by allowing that customer to select desired functions from a limited number of available services. This approach, which has been called programming a service, may leave many customers without desired functionality. For example, a customer who wants call waiting, but in a form slightly different from what is made. Moreover, adding a new service to existing services creates significant problems due to possible interaction between the new and existing services. This creates additional obstacles to implementing new telephone services. For example, it is very possible that adding a new service, such as call waiting, may be incompatible in certain circumstances with an existing service, such as call transfer on busy. The usual solution to such interaction problems is to prevent both services from being used by the customer simultaneously. This, of course, limits the power of the new service.

Even when services are compatible, the conventional approach to providing customer services often forces a customer desiring a few limited features of several services to subscribe to several complete services. This is both costly and inefficient.

U.S. Pat. No. 4,611,094 (Asmuth et al.) teaches a method for defining an individual service for an individual customer. In that method, a telephone service is performed by a customer program which a customer defines using conventional program sequences. The program may be executed on the customer's host computer external to the telephone network when a call is processed. Although this method permits a new individual customer service to be configured without modifying the telephone network switching system software, the applicability of such a method is extremely limited. For example, this method cannot implement a new service on a network wide basis because each service is specific to the customer who designed it. This method also requires every customer who uses the service to have an individual host computer external to the telephone system. Furthermore, designing a service requires a computer programmer to write program sequences to define the service, and a programer must make changes to the program sequences to modify the service.

Although the attempt at customization in Asmuth et al. laudable, it highlights the problems which designers have faced in attempting to leave the conventional philosophy of programming a service. One problem is the hardware limitations. The software for developing a customized service for each user must be able to be used on different platforms so that the capability of designing services, as well as testing them, can be made available to as many users as possible.

Examples of patents illustrating various forms of telephone call monitoring include the following:

Applebaum U.S. Pat. No. 3,320,368 describes a hotel-type telephone set having a signal lamp. A battery powered ringing signal detector is provided to energize the signal flasher lamp and activate it to indicate that a message is waiting.

Myslinski et al U.S. Pat. No. 4,582,959 describes a PBX telephone answering message storage system which either permits storage of a message or stores a call back message on demand from a caller. In either case the system actuates an automatic message waiting lamp at the intended station in response to the storage of the message.

Schmitt U.S. Pat. No. 4,506,115 describes a message waiting lamp system wherein each hand set is provided with a message waiting lamp and a transmitter for actuating that lamp in response to an out of band signal.

Boeckmann U.S. Pat. No. 4,648,109 describes another PBX extension telephone message waiting indication in the form of an LED controlled from the PABX.

Yuan U.S. Pat. No. 4,280,021 discloses a signal waiting lamp activator for a PABX system.

Duff et al U.S. Pat. No. 3,742,792 describes a message waiting lamp and controller for use with key telephone systems.

In addition to the foregoing ROMAR Ltd. of Colorado Springs, Colo., has advertised a voice message waiting indicator that is a customer premise based product that automatically detects the presence of stutter dial tone on a central office, Centrex, or PBX line and activates a message-waiting light. The device is designed to be connected between the telephone set and a modular RJ11 jack. The device is said to begin an automatic detection process after an unanswered incoming call, after any off-hook resulting from an incoming or outgoing call, or periodically to detect system messages left when no call was placed to the user's telephone.

ALLTEL Supply of Norcross, Ga., has advertised a so-called Message Monitor which is said to allow users of a network-based voice mail service to call screen messages as they are being left within the network voice mailbox. The device appears to be relatively complex to program and entails the disadvantage of requiring an internal voice mail prompt (contained within the unit itself), before allowing the caller to leave a message within the network-based voice mailbox. In other words, two separate sets of prompts must be handled by the caller to arrive at the greeting in a subscriber's voice mailbox. There is also a time delay as a result of this requirement, approximately forty seconds, and the disadvantage of allowing the caller to hear a number of switch hook relays before the call arrives at the voice mailbox. In addition, this device includes circuitry to allow unanswered incoming calls to be automatically forwarded to a voice mail system (or to any other telephone number) using the standard central office 3-way calling feature. As the incoming call is forwarded, a speaker is activated enabling the user to monitor the message being left by the caller as is common in CPE telephone answering machines. The device is said to be usable with any single-party line equipped with tone dialing, 3-way calling and a touch tone telephone. The device is said to be fully programmable using a telephone touch tone dial at the point of sale, at the customer location, or from a remote location. The device includes a power supply which plugs into a standard AC outlet.

In addition, the design of services cannot require standard programming because the cost and difficulty of providing such customization will make it too expensive to employ.

Accordingly, it is desirable to have a system capable of providing multi-function, single services that can be implemented economically.

Another desirable feature for such a system would be a mechanism for designing multi-function, single services easily and without need for knowledge of the underlying system.

Yet another desirable feature would be easy transportability of the system, or of parts of the system, to other machines or devices.

It is also desirable to provide a system to allow easy testing and implementation of new multi-functioning, single services.

Additional desires of the invention will be set forth in the description which follows, and in part will be apparent from the description, or may be learned by practice of the invention. The advantages of the invention may be realized and obtained by means of the instrumentalities and combinations particularly pointed out in the appended claims.

Numerous innovations for telephone monitoring systems have been provided in the prior art that are described as follows. Even though these innovations may be suitable for the specific individual purposes to which they address, they differ from the present invention as hereinafter contrasted.

U.S. Pat. No. 5,276,768

Automated telephone information system

James L. Bander

A system for responding to telephone queries for transit system information is disclosed in which the information received by transit information operators is used to initiate a pathfinding query, which results in a search using a heuristic method with Island Sets being performed in order to determine, for example, an itinerary which the operator can relate to the caller which answers the caller's query. A stopping rule, based on clock time, iteration count, openings of goal nodes, adjustments of goal node labels and the state of the transaction queue is also disclosed.

U.S. Pat. No. 5,243,642

Telephone call management device

Laird H. Wise and Michael H. Kendall

A small portable self-contained, battery powered consumer premise call management device adapted to be connected to a telephone network termination node on a premise to provide audible monitoring of signals on the termination node by depression of a control button. The device includes a battery powered signal lamp triggered by a ringing signal and latched in an on condition until the control button is depressed. The device provides a call notification signal and is usable with and complementary to both network provide and consumer premise equipment providing telephone answering services.

U.S. Pat. No. 5,241,588

Systems and processes providing programmable or customized customer telephone information services David L. Babson and Thomas C. Ely A method and apparatus for creating and implementing customer service procedures for individual customers of a telephone network. The method and apparatus provides for the creation and execution of customized call processing information (CCPI) records to provide the desired service. The CCPI records are created by an operator at a display terminal to provide a visual representation of the desired service. The displayed representation of the service is translated into a binary representation and executed in a call processing environment to process calls to or from a phone number identified by the customer, in accordance with the customer's desires. Thus, each individual customer can design and have implemented unique telephone services.

Numerous innovations for telephone monitoring systems have been provided in the prior art that are adapted to be used. Even though these innovations may be suitable for the specific individual purposes to which they address, they would not be suitable for the purposes of the present invention as heretofore described.

SUMMARY OF THE INVENTION

It is accordingly an object of the invention to provide a small, inexpensive, self-powered ttelephone monitoring systems capable of performing multiple functions including call and message notification, call monitoring, ring interruption, call forwarding and other functions for use with both a customer premise answering machine or a central office or network provided answering service.

It is another object of the invention to provide a telephone call management device which includes a connector for connecting the device to a telephone line in a premise, a telephone line ring detector circuit which is responsive to a ringing signal, and a speaker and display monitorwhich is connected to audibly and visually monitor signals on the telephone line in the premise when the manually actuatable switch is actuated.

It is another object of the invention to provide a telephone call management device of the foregoing type which includes a second manually operable switch mounted in the housing and effective in one switch position to cause the speaker to be connected to monitor the telephone signals without creating an off-hook condition which results in seizing the calling telephone line, and effective in a second position to cause the speaker to be connected to audibly monitor the signals on the telephone line by seizing the calling telephone line, and a third position whereby the display screen monitors the telephone calls.

It is still another object of the invention to provide a telephone call management device of the foregoing type wherein all energization continuing until such time as the manual actuating switch for initiating monitoring is released.

It is another object of the invention to provide an adjunct unit of the foregoing type which will readily meet FCC Registration and Underwriters Laboratories approval, and in addition, will meet standards required by telephone companies either national or international.

It is another object of the invention to provide a telephone monitoring systems unit of the foregoing type which shall readily interface with various central office, PBX, PABX, and network-based systems for both foreign and domestic networks. This interface takes into account the various provisions of network based ring signaling, and off-hook line monitoring for various foreign and domestic networks.

It still another object of the invention to provide a telephone monitoring systems of the foregoing type at such a modest cost as to make the installation of multiple units readily feasible to provide remote notification and monitoring capabilities in both residential and business environments.

Additional objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments and its several details are capable of modifications in very obvious respects, all without departing from the invention. Accordingly, the drawings and description are to be regarded as illustrative in nature, and not as restrictive.

To achieve the foregoing desires, and in accordance with the purposes of the invention as embodied and broadly described herein, this invention provides a system which can accommodate design, testing and processing of a multi-function service for each subscriber requesting such a service. The service is used either when a telephone number for the service is called or when a call is made from the corresponding telephone line. The service is built using a multi-level software scheme that includes a graphical level to allow easy design and testing of services.

Specifically, a system of this invention for providing services for individual customers to a telephone network in response to requests for the customer services preferably comprises customized procedure storage means for storing a plurality of custom customer service procedures; request receiving means for receiving requests for custom customer services; customer identification means, coupled to the request receiving means, for determining the custom customer service procedures corresponding to the received requests; procedure fetch means, coupled to the customer identification means and to the customized procedure storage means, for retrieving from the customized procedure storage means the custom customer service procedures corresponding to each of the requests; and execution means, coupled to the procedure fetch means, for executing the retrieved custom service procedures to provide custom services for the customers.

A method of this invention for providing services for individual customers of a telephone network in response to requests from the customers preferably comprises the steps, executed by a data processor, of storing a plurality of customer service procedures, each of the customer service procedures corresponding to a different one of the customers of the network, receiving requests for custom customer services; determining the custom customer service procedures corresponding to the received requests; retrieving from a customized procedure storage means the custom customer service procedures corresponding to each of the requests; and executing the retrieved service procedures to provide services for the customers.

Alternatively, a method according to this invention of creating an executable procedure to provide customized services for individual customers of a telephone network, preferably comprises the steps, executed by a creation data processor, of receiving for one of the customers customized specifications for conditions to be tested and actions to be taken according to the results of testing the conditions; displaying the received conditions and actions visually in a manner which indicates relationships between the conditions and the actions; and converting the displayed conditions and actions into a procedure which can be executed by a service data processor and which corresponds to the one customer.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

FIG. 4 is a front view of display screen 2 which exhibits "A" display comprising:
1) Day
2) Date
3) Phone number dialed
4) Time call was made
5) Time call ended
6) Total length of time talked
7) Price per minute
8) Total price for that phone call FIG. 5 is a front view of display screen 2 which exhibits "B" display comprising:
1) Day
2) Date
3) Phone number of the last person to call you
4) Time call was made
5) Time call ended (if applicable)
6) Total length of time talked, if any (someone may have tried to reach you when you weren't home)

FIG. 6 is a front view of display screen 2 which exhibits "C" display comprising:
1) Day 2) Date 3) Time call was made 4) Length of each phone call 5) Price per minute 6) Cost of each phone call 7) The total number of times number was dialed during this billing period 8) The total cost of all if any of these phone calls.

FIG. 7 is a front view of display screen 2 which exhibits "C3" display comprising:

1) Time call began

2) Time Call ended

3) Total time talked

4) Price per minute

5) Total price of Call

Figure 1:
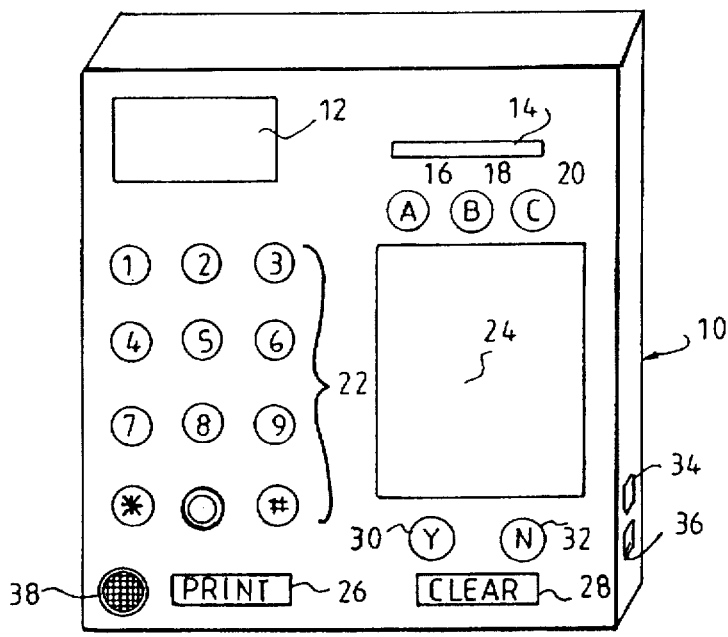
FIG. 1 is a perspective view of a telephone management system exhibiting a display screen 1, a printer, pushbuttons A, B, and C, numeric keypad, display screen 2, print and clear pushbuttons, Y and N pushbuttons and telephone interface.

FIG. 8 is a front view of display screen 2 which exhibits "C4" display comprising data entry screen:

1) Enter amount for day

2) Enter amount for week

3) Enter amount for month

FIG. 9 is a front view of display screen 2 which exhibits "C4" display comprising data entry call alarm screen:

1) Your cost for today has reached

2) You have a present limit for $X.00, should you continue this phone call, you will have reached your limit in X minutes.

FIG. 10 is a front view of display screen 2 which exhibits "C4" display comprising data entry call alarm screen:

1) Enter # calls for day

2) Enter # calls for week

3) Enter #calls for month

FIG. 11 is a front view of display screen 2 which exhibits "C4" display comprising data entry call alarm screen:

1) Your present time limit for the day is X phone calls, you are about to make your Xth one FIG. 12 is a front view of display screen 2 which exhibits "C6" display comprising telephone summary calls in time frame display screen:

1) Date

2) Calls in time frame, such as X:00(AM or PM) to X:00(AM or PM)

3) Time of call #1 and duration

4) Time of call #2 and duration and so forth

5) Total nuber of calls

6) Total number of minutes

FIG. 13 is a front view of display screen 2 which exhibits "C7" display #1 comprising call blocking display entry screen:

1) Do you wish to block numbers [ ] Yes or [ ] No

2) Do you wish to allow new numbers [ ] Yes or [ ] No

3) List of current allowed numbers

4) Add additional numbers

5) Which numbers do you want blocked?

6) Do you wish to have these numbers blocked during this time period [ ] Yes or [ ] Indefinately No FIG. 14 is a front view of display screen 2 which exhibits "C7" display #2 comprising call blocking display entry screen:

1) Do you wish to block numbers? [ ] Yes or [ ] No

2) Do you wish to allow new numbers? [ ] Yes or [ ] No

3) List of current numbers

4) Which numbers do you want blocked?

5) Do you wish to have these numbers blocked during this time period? [ ] Yes or [ ] No FIG. 15 is a front view of display screen 2 which exhibits "C8" display comprising data entry call alarm screen:

1) You have preset limit for each phone call of $X.00

2) Your cost as of now has reached $X.00, should you continue this call, you have reached your preset limit in X minutes FIG. 16 is a front view of display screen 2 which exhibits "C9" display comprising long distance calls screen:

1) Date 2) phone number 3) time of phone call 4) duration of phone call

5) Cost of phone call

FIG. 17 is a front view of display screen 2 which exhibits "C8" display comprising telephone management personal access code entry screen:

1) Enter you personal access code to activate the telephone management system

LIST OF REFERENCE NUMERALS UTILIZED IN THE DRAWING

10 - TELEPHONE MANAGEMENT SYSTEM
12 - DISPLAY SCREEN 1
14 - PRINTER
16 - PUSHBUTTON A
18 - PUSHBUTTON B
20 - PUSHBUTTON C
22 - NUMERIC KEYPAD
24 - DISPLAY SCREEN 2
26 - PRINT PUSHBUTTON
28 - CLEAR PUSHBUTTON
30 - Y-PUSHBUTTON
32 - N-PUSHBUTTON
34 - TELEPHONE INTERFACE LINE 1
36 - TELEPHONE INTERFACE LINE 2
38 - SPEAKER

DETAILED DESCRIPTION OF THE PREFERRED EMBODIMENT

Now referring to FIG. 1 is a perspective view of a telephone management system 10 exhibiting a display screen #1 12, a printer 14, pushbuttons A 16, B 18, and C 20, numeric keypad 22, display screen #2 24, print 26 and clear 28 pushbuttons, Y-pushbutton 30 and N-pushbutton 32 and telephone interface 34 and 36.

Figure 2:
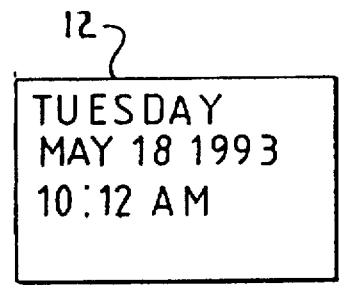
FIG. 2 is a front view of display screen 2 which constantly exhibits day, date and time.

Now referring to FIG. 2 is a front view of display screen #2 24 which constantly exhibits day, date and time.

Figure 3:
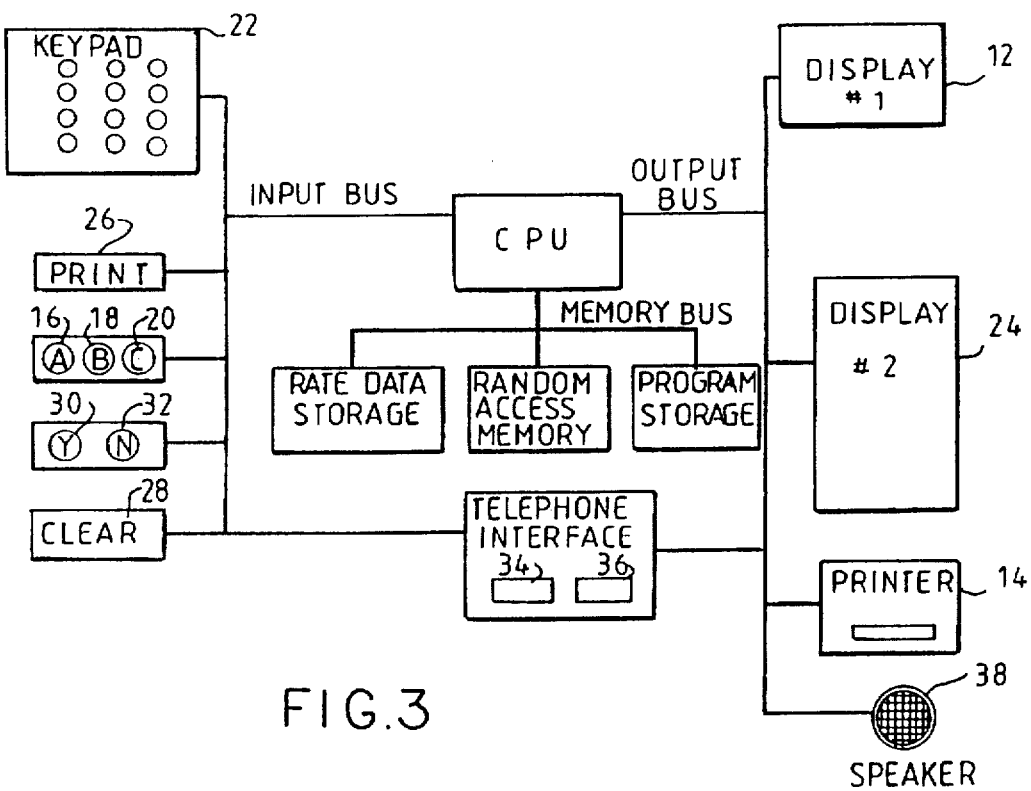
FIG. 3 is a schematic view of a telephone management system exhibiting a display screen 1, a printer, pushbuttons A, B, and C, numeric keypad, display screen 2, print and clear pushbuttons, Y and N pushbuttons and telephone interface.

Now referring to FIG. 3 is a schematic view of a telephone management system 10 exhibiting a display screen #1 12, a printer 14, pushbuttons A 16, B 18, and C 20, numeric keypad 22, display screen #2 24, print 26 and clear 28 pushbuttons, Y-pushbutton and N-pushbutton and telephone interface 34 and 36, and speaker 38.

Now referring to FIG. 4 is a front view of display screen #2 24 which exhibits "A" display comprising:

1) Day

2) Date

3) Phone number dialed

4) Time call was made
5) Time call ended
6) Total length of time talked
7) Price per minute
8) Total price for that phone call Now referring to FIG. 5 is a front view of display screen #2 24 which exhibits "B" display comprising:
1) Day
2) Date
3) Phone number of the last person to call you
4) Time call was made
5) Time call ended (if applicable)
6) Total length of time talked, if any (someone may have tried to reach you when you weren't home)

Now referring to FIG. 6 is a front view of display screen #2 24 which exhibits "C" display comprising:
1) Day
2) Date
3) Time call was made
4) Length of each phone call
5) Price per minute
6) Cost of each phone call
7) The total number of times number was dialed during this billing period
8) The total cost of all if any of these phone calls.

Now referring to FIG. 7 is a front view of display screen #2 24 which exhibits "C3" display comprising:
1) Time call began
2) Time Call ended
3) Total time talked
4) Price per minute
5) Total price of Call Now referring to FIG. 8 is a front view of display screen #2 24 which exhibits "C4" display comprising data entry screen:
1) Enter amount for day
2) Enter amount for week
3) Enter amount for month Now referring to FIG. 9 is a front view of display screen #2 24 which exhibits "C4" display comprising data entry call alarm screen:
1) Your cost for today has reached
2) You have a present limit for $X.00, should you continue this phone call, you will have reached your limit in X minutes.

Now referring to FIG. 10 is a front view of display screen #2 24 which exhibits "C4" display comprising data entry call alarm screen:
1) Enter # calls for day
2) Enter # calls for week
3) Enter # calls for month Now referring to FIG. 11 is a front view of display screen #2 24 which exhibits "C4" display comprising data entry call alarm screen:
1) Your present time limit for the day is X phone calls, you are about to make your Xth one Now referring to FIG. 12 is a front view of display screen #2 24 which exhibits "C6" display comprising telephone summary calls in time frame display screen:
1) Date
2) Calls in time frame, such as X:00(AM or PM) to X:00(AM or PM)

3) Time of call #1 and duration
4) Time of call #2 and duration and so forth
5) Total nuber of calls
6) Total number of minutes Now referring to FIG. 13 is a front view of display screen #2 24 which exhibits "C7" display #1 comprising call blocking display entry screen:
1) Do you wish to block numbers [ ] Yes or [ ] No
2) Do you wish to allow new numbers [ ] Yes or [ ] No
3) List of current allowed numbers
4) Add additional numbers
5) Which numbers do you want blocked?
6) Do you wish to have these numbers blocked during this time period [ ] Yes or [ ] Indefinately No Now referring to FIG. 14 is a front view of display screen #2 24 which exhibits "C7" display #2 24 comprising call blocking display entry screen:
1) Do you wish to block numbers? [ ] Yes or [ ] No
2) Do you wish to allow new numbers? [ ] Yes or [ ] No
3) List of current numbers
4) Which numbers do you want blocked?
5) Do you wish to have these numbers blocked during this time period? [ ] Yes or [ ] No Now referring to FIG. 15 is a front view of display screen #2 24 which exhibits "C8" display comprising data entry call alarm screen:
1) You have preset limit for each phone call of $X.00
2) Your cost as of now has reached $X.00, should you continue this call, you have reached your preset limit in X minutes Now referring to FIG. 16 is a front view of display screen #2 24 which exhibits "C9" display comprising long distance calls screen:
1) Date
2) phone number
3) time of phone call
4) duration of phone call
5) Cost of phone call Now referring to FIG. 17 is a front view of display screen #2 24 which exhibits "C8" display comprising telephone management personal access code entry screen:
1) Enter you personal access code to activate the telephone management system It will be understood that each of the elements described above, or two or more together, may also find a useful application in other types of constructions differing from the type described above.

While the invention has been illustrated and described as embodied in a telephone management system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of monitoring telephone usage which comprises the steps of:
   a) displaying a personal access code entry screen which prompts the user to enter an access code, which, upon being entered, allows;
   b) pressing a first functional pushbutton one or more times to display information pertaining to a previous outgoing telephone call, wherein pressing said first functional pushbutton once displays information pertaining to the most recent outgoing telephone call and each subsequent keypress displays information pertaining to the next previous outgoing telephone call;
   c) pressing a second functional pushbutton one or more times to display information pertaining to a previous incoming telephone call, wherein pressing said second functional pushbutton once displays information pertaining to the most recent incoming telephone call and each subsequent keypress displays information pertaining to the next previous incoming telephone call;
   d) pressing a third functional pushbutton to display information pertaining to total telephone usage during a prior time period;
   e) pressing a fourth functional pushbutton to display information pertaining to total telephone usage during the current time period;
   f) pressing a fifth functional pushbutton to display a screen prompting the user to enter a telephone number, which, when entered, displays information pertaining to total telephone usage with the entered telephone number;
   g) pressing a sixth functional pushbutton to display a screen prompting the user to enter a numerical amount to be used as a recommended cost limit, which, when entered, notifies the user when reached;
   h) pressing a seventh functional pushbutton to display a screen prompting the user to enter a numerical amount to be used as a recommended call limit, which, when entered, notifies the user when reached;
   i) pressing an eighth functional pushbutton to display a screen prompting the user to enter a beginning and ending date and time defining a specific time period, which, when entered, displays information pertaining to all outgoing calls made within the time period;
   j) pressing a ninth functional pushbutton to display a screen prompting the user to enter a telephone number or numbers to be either 1) blocked from outgoing access, or 2) excluded from a general outgoing call block;
   k) pressing a tenth functional pushbutton to enable a warning which is displayed when a telephone call reaches a predetermined cost limit; and
   l) pressing an eleventh functional pushbutton to display information pertaining to all outgoing telephone calls made outside of the local area code.

2. A method as defined in claim 1, wherein the information displayed by said first functional pushbutton comprises:
   i) day;
   ii) date;
   iii) phone number dialed;
   iv) time call was made;
   v) time call ended;
   vi) total length of time of call;
   vii) price per minute; and
   viii) total price of call.

3. A method as defined in claim 1, wherein the information displayed by said second functional pushbutton comprises:
   i) day;
   ii) date;
   iii) originating phone number;
   iv) time call was made;
   v) time call ended; and
   vi) total length of time of call.

4. A method as defined in claim 1, wherein the information displayed by said fifth functional pushbutton comprises:
   i) day;
   ii) date;
   iii) times calls were made;
   iv) length of each individual call;
   v) cumulative length of time of all calls;
   vi) price per minute;
   vii) cost of each individual call;
   viii) total number of times the number was dialed during the selected period; and
   ix) cumulative cost of all calls.

5. A telephone management apparatus comprising a display screen and a set of functional pushbuttons, wherein pressing said pushbuttons causes said display screen to display telephone management information according to the method of claim 1.

* * * * *